3,399,236
AMMONOLYSIS OF ALKYL HALIDES
King L. Mills, Jr., Bartlesville, Okla., assignor to Phillips Petroleum Company, a corporation of Delaware
No Drawing. Filed Aug. 9, 1965, Ser. No. 478,475
5 Claims. (Cl. 260—585)

ABSTRACT OF THE DISCLOSURE

In the formation of alkyl amines by the ammonolysis of alkyl halides in the presence of an alcohol, the ammonolysis process is initially carried out in the presence of at least one alkyl amine in an amount effective to prevent the formation of ammonium halide.

---

This invention relates to the preparation of alkyl amines.

A basic method for the preparation of alkyl amines is the ammonolysis of alkyl halides. This method is conventionally carried out in the presence of an alcohol as the reaction medium or diluent, and produces the desired alkyl amine in the form of a primary hydrohalide salt ($RNH_2 \cdot HX$), where R is the alkyl radical and X is a halide). The free alkyl amine is then formed by reacting the hydrohalide salt with a base stronger than the alkyl amine, e.g. an alkali such as sodium hydroxide.

During this alkylation operation hydrogen halide is liberated through the formation of by-products such as secondary and tertiary hydrohalide salts ($R_2NH \cdot HX$ and $R_3N \cdot HX$) as well as through the formation of the primary hydrohalide salt, and the dehydrohalogenation of the alkyl halide to form an olefin. This free or excess hydrogen halide reacts at least in part with the ammonia present to form an ammonium halides which are substantially insoluble in the alcohol reaction medium and therefore form a second phase in the alkylation reactor. The formation of this substantially insoluble second phase creates the problem of removing mixed liquid phases from the alkylation reactor and then separating these phases, all of which adds expense and further processing steps to the basic method.

It has now been found that if an alkyl amine is present during the alkylation operation it will react with the excess hydrogen halide as it is formed to thereby produce a soluble hydrohalide salt. Thus, the above problem relating to mixed liquid phases being present in the reactor is eliminated.

Accordingly, it is an object of this invention to provide a new and improved method for preparing alkyl amines.

Other aspects, objects, and the several advantages of this invention will be readily apparent to those skilled in the art from the description and the appended claims.

According to this invention a primary alkyl amine ($RNH_2$) is employed with the other reactants for the alkylation operation in an amount effective to prevent the substantial formation of insoluble ammonium halide compounds which is generally from about 0.25 to about 3, preferably from about 0.5 to about 1.5 mols per mol of alkyl halide charged to the reactor. The alkyl radical of the alkyl amine (R) can have from 1 to 20, preferably 5 to 20, carbon atoms. Representative alkyl amines which can be used in this invention include aminomethane, 1-aminopropane, 2-aminopropane, 2-amino-2-methylpropane, 1-aminohexane, 2-aminooctane, 2-amino-3-methylnonane, 1-aminodecane, 3-amino-2,3,4-trimethyloctane, 2-aminododecane, 7-(2-methylbutyl)-6-aminopentadecane, 2-aminooctadecane, 1-aminoeicosane, and the like including mixtures thereof. It is present preferred that the alkylamine employed be the same as or substantially similar to the alkyl amine being produced by the alkylation operation.

The alcohol employed is at least one selected from the group consisting of alkyl and cycloalkyl, preferably alkyl, alcohols. The alkyl radical of the alcohol preferably has from 1 to 8 carbon atoms per moecule, inclusive, and the cycloalkyl radical of the alcohol preferably has from 3 to 8 carbon atoms per molecule, inclusive. Representative alcohols include methanol, ethanol, 2-propanol, 2-methyl-1-hexanol, 2-methyl-2-heptanol, 1-octanol, cyclopropanol, cyclopentanol, cyclooctanol, and the like.

The alkyl halides which can be used in this invention for preparing the alkylamines are preferably those in which the halide is attached to primary or secondary carbon atom of the alkyl chain. These alkyl halides can be represented by the general formula RX, where R is an alkyl radical which has 1 to 20 carbon atoms, preferably from 5 to 20 carbon atoms, and X is a halogen such as iodine, chlorine, or bromine. Representative alkyl halides which can be used in this invention include methyl chloride, methyl bromide, methyl iodide, ethyl chloride, 1-chloropropane, 2-iodopropane, 2-bromo-2-methylpropane, 2-chloro-2-methylpropane, 1-chloropentane, 1-bromohexane, 1-iodooctane, 2-bromooctane, 2-bromo-3-methylnonane, 1-iododecane, 1-chlorodecane, 5-iodododecane, 3-bromo-2,3,4-trimethyloctane, 1-chlorododecane, 2-chlorododecane, 7-(2-methylbutyl)-6-bromopentadecane, 5-bromotetradecane, 6-chlorohexadecane, 2-chlorooctadecane, 1-bromoeicosane, and the like, including mixtures thereof. An example of a feed containing mixed alkyl halides which can be used in this invention is that which is produced by the chlorination or bromination of a paraffin mixture such as kerosene or paraffins which result from the treatment of kerosene with molecular sieves.

The reaction conditions employed in this invention can vary widely but will generally be those effective for ammonolysis conditions. Generally, reaction temperatures will be in the range of from about 200 to about 650, preferably 250 to 600° F. Reaction pressures can be autogenous pressures developed by the reaction mixtures at the chosen reaction temperature, which pressures can vary from 500 to 2500 p.s.i.g. and higher, particularly when high mol ratios of ammonia to alkyl halide are employed. The reaction times will vary considerably depending upon the reaction temperature and other variables, but will generally be in the range of from about 0.5 to about 10, preferably 0.5 to 3, hours. The reaction can be carried out in a batch or continuous manner.

The amount of alcohol used will be that sufficient to serve as a diluent or reaction medium for the reaction. Usually the alcohol will be from about 25 to about 95, preferably from about 40 to about 80 weight percent of the combined alcohol-ammonia charge. If desired, the alcohol can be employed in a ratio of one volume of alcohol per volume of alkyl halide charged to the reactor. The alcohol and ammonia can be charged to the reaction zone, or if desired, ammonia can be bubbled into the alcohol and the ammonia-alcohol solution charged to the reactor. The ammonia employed can be in gaseous or liquid form or both. The reaction is preferably carried out under anhydrous conditions, but small amounts of water up to 5 weight percent of the total weight of the reaction mixture can be tolerated. Generally, the mol ratio of ammonia to alkyl halide is from 2/1 to 50/1, preferably 5/1 to 20/1.

The free alkyl amine product of the process can be recovered from the reaction mixture by any suitable procedure such as distillation, solvent extraction, and the like since the reaction mixture is substantially completely a single liquid phase and not a mixture of a liquid phase and a solid phase.

Example

Ammonia, 2-aminodecane and 2-chlorodecane are charged to a reactor in the mol ratio of 15/0.75/1, respectively. Methanol is also charged to the reactor in the amount of one volume per volume of 2-chlorodecane charged to the reactor.

The mixture is stirred in the reactor and heated at about 500° F. and about 1500 p.s.i.g. for about 2 hours after which gaseous ammonia is vented from the reactor and a substantially single liquid phase reaction product mixture remains behind.

This liquid phase is composed primarily of methanol in which is dissolved the hydrochloride salt of decylamine. Minor amounts of ammonia, unconverted 2-chlorodecane, and olefin by-products are also dissolved in the methanol in a combined amount of less than 5 weight percent based upon the total weight of the liquid phase. The liquid phase is substantially free of a second substantially solid phase of substantially insoluble ammonium chloride.

Free 2-aminodecane is obtained from the liquid phase by conventional distillation procedures.

Reasonable variations and modifications are possible within the scope of this disclosure without departing from the spirit and scope thereof.

I claim:

1. In the method for the preparation of alkyl amines by the ammonolysis of alkyl halides of one of chlorine, bromine, and iodine in the presence of an alcohol, the improvement comprising initially carrying out said ammonolysis in the presence of at least one primary alkyl amine compound in an amount of from about 0.25 to about 3 mols per mol of alkyl halide, and recovering the free alkyl amine.

2. The method according to claim 1 wherein said alkyl halides have the general formula RX, where R is an alkyl radical with from 1 to 20 carbon atoms and X is a halogen which is attached to a primary or secondary carbon atom of said alkyl radical.

3. The method according to claim 1 wherein said alkylamine compound contains from 1 to 20 carbon atoms per molecule.

4. A method for preventing the formation of substantially insoluble ammonium halides during the preparation of alkyl amines by the ammonolysis of alkyl halides having the general formula RX, where R is an alkyl radical and X is a halogen which is attached to a primary or secondary carbon atom of said alkyl radical and is one of chlorine, bromine, and iodine, the preparation being carried out in the presence of at least one alcohol having the general formula ROH where R is a radical selected from the group consisting of alkyl radicals having from 1 to 8 carbon atoms and cycloalkyl radicals having from 3 to 8 carbon atoms, the improvement comprising initially carrying out said ammonolysis in the presence of from about 0.25 to about 3 mols per mol of alkyl halide of at least one primary alkylamine wherein the alkyl radical in said amine contains from 1 to 20 carbon atoms and recovering the free alkyl amine.

5. The method according to claim 4 wherein said alkyl halide is 2-chlorodecane, said alcohol is methanol, and said alkylamine is 2-aminodecane.

References Cited

UNITED STATES PATENTS 2,760,979   8/1956   Wimmer _____ 260—585

CHARLES B. PARKER, *Primary Examiner.*

R. L. RAYMOND, *Assistant Examiner.*